(12) United States Patent
Behn et al.

(10) Patent No.: US 9,273,721 B2
(45) Date of Patent: Mar. 1, 2016

(54) BEARING DEVICE AND SOLAR POWER PLANT UNIT USING THE SAME

(71) Applicants: Markus Behn, Diekholzen (DE); Heinz Breunig, Aschaffenburg (DE); Tristan Kaiser, Talheim (DE); Henning Kern, Schweinfurt (DE); Hans-Juergen Liesegang, Schortens (DE); Mathias Noeth, Wasserlosen (DE); Christina Pfeuffer, Eußenheim (DE); Mathias Seuberling, Großeibstadt (DE)

(72) Inventors: Markus Behn, Diekholzen (DE); Heinz Breunig, Aschaffenburg (DE); Tristan Kaiser, Talheim (DE); Henning Kern, Schweinfurt (DE); Hans-Juergen Liesegang, Schortens (DE); Mathias Noeth, Wasserlosen (DE); Christina Pfeuffer, Eußenheim (DE); Mathias Seuberling, Großeibstadt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 285 days.

(21) Appl. No.: 13/855,875

(22) Filed: Apr. 3, 2013

(65) Prior Publication Data
US 2013/0286494 A1 Oct. 31, 2013

(30) Foreign Application Priority Data

Apr. 3, 2012 (DE) .......................... 10 2012 205 486

(51) Int. Cl.
*G02B 7/182* (2006.01)
*F16C 21/00* (2006.01)
*F16C 19/26* (2006.01)
*F16C 13/04* (2006.01)
*F24J 2/54* (2006.01)

(52) U.S. Cl.
CPC ................ *F16C 19/26* (2013.01); *F16C 13/04* (2013.01); *F24J 2/541* (2013.01); *G02B 7/182* (2013.01); *F24J 2002/5482* (2013.01); *Y02E 10/47* (2013.01)

(58) Field of Classification Search
CPC ........ G02B 7/182; G02B 7/00; F16C 27/066; F16C 13/02; F16C 13/04; F16C 19/06; F16C 19/18; F16C 19/542; F16C 23/086; F16C 25/06; F16C 19/36; F16C 19/49
USPC ......... 384/126, 127, 226–231, 252, 256, 261, 384/283, 282, 416, 428, 445, 521, 522, 528, 384/529, 535, 548, 549, 56; 359/872
See application file for complete search history.

(56) References Cited

U.S. PATENT DOCUMENTS

| | | | |
|---|---|---|---|
| 4,484,568 A | 11/1984 | Witt | |
| 4,856,172 A * | 8/1989 | Ahmed et al. | 29/434 |
| 7,950,386 B2 * | 5/2011 | Lievre | 126/600 |

(Continued)

FOREIGN PATENT DOCUMENTS

| | | |
|---|---|---|
| CN | 102012124 A | 4/2011 |
| DE | 2346137 A1 | 3/1974 |
| DE | 102009039021 A1 | 7/2011 |

(Continued)

*Primary Examiner* — Jade R Chwasz
(74) *Attorney, Agent, or Firm* — Bryan Peckjian; SKF USA Inc. Patent Dept.

(57) ABSTRACT

A bearing device for a solar power plant unit includes at least one support element, at least one first roller and at least one second roller. At least one first roller bearing unit is movably supported on the support element and rotatably supports the at least one first roller and the one second roller. At least one first spherical plain bearing having an outer ring is attached to the at least one first roller. A solar power plant includes at least one mirror movably supported by at least one such bearing device.

20 Claims, 2 Drawing Sheets

(56) References Cited

U.S. PATENT DOCUMENTS

2006/0105845 A1* 5/2006 Girguis .................. 464/111
2011/0048405 A1 3/2011 Koetter et al.

FOREIGN PATENT DOCUMENTS

| GB | 1392145 A | 4/1975 |
|---|---|---|
| GB | 1402298 A | 8/1975 |

* cited by examiner

BEARING DEVICE AND SOLAR POWER PLANT UNIT USING THE SAME

CROSS-REFERENCE

This application claims priority to German patent application no. 10 2012 205 486.3 filed on Apr. 3, 2012, the contents of which are fully incorporated herein by reference.

TECHNICAL FIELD

The present teachings generally relate to a bearing device for a solar power plant unit and to a solar power unit containing the same.

BACKGROUND

A bearing unit for a solar power plant unit, which includes pylons, is known from DE 10 2009 039 021 A1 (US 2011/0048405). The pylons support two rotatably-borne rollers, which assist in supporting (bearing) a torque (torsion) tube that is connected to a mirror.

SUMMARY

It is an object of the present teachings to provide a bearing (bearing device) for a solar power plant unit that is, e.g., more efficient and/or has a longer service life.

In one aspect of the present teachings, the bearing (bearing device) for a solar power plant unit includes at least one support element and at least one first roller bearing unit, which at least rotatably supports at least a first roller and a second roller. The roller bearing unit is movably supported on the support element.

As used herein, a "bearing (bearing device) for a solar power plant unit" shall in particular be understood to mean a unit that at least contributes to movably supporting (bearing) a unit of a solar power plant, such as e.g., a panel having solar cells, wherein the unit is preferably formed as a bearing unit for a solar power plant mirror unit.

As used herein, a "bearing (bearing device) for a solar power plant mirror unit" shall in particular be understood to mean a unit that at least contributes to movably supporting (bearing) a mirror unit of a solar power plant. The mirror unit can include one or a plurality of mirrors.

A "support unit" shall in particular be understood to mean a unit that at least partially supports the weight of the roller bearing unit, wherein the support unit, in a completely assembled/installed state, preferably transfers the force of the completely or partially supported weight to the ground. The fact that the roller bearing unit "at least" rotatably supports (bears) a roller, shall in particular be understood to mean that the roller bearing unit has at least one area on which the roller bearing unit rotatably supports (bears) the roller, wherein the supporting (bearing) of the roller by the roller bearing unit can also permit a movement of the roller relative to the area, which movement is different from rotation about an axis of the roller.

A highly efficient bearing (bearing device) for a solar power plant unit can be achieved with the present teachings. For example, in a relatively compact design an optimal positioning of the rollers can be achieved relative to an element of the solar power plant, in particular to a torque (torsion) tube unit, to support forces. In addition or in the alternative, it is possible that additional rollers may contribute to supporting the forces, in which case low Hertzian stresses on the individual rollers, and thereby a long service life, can be achieved.

The roller bearing unit is preferably rotatably supported (borne) on the support element, whereby a simple and effective design can be achieved.

In another aspect of the present teachings, the bearing (bearing device) for a solar power plant unit may further include at least one second roller bearing unit, which rotatably supports (bears) at least one third roller. In such an embodiment, a distribution of supported forces onto at least three rollers can be achieved, which would allow the rollers to be manufactured from unhardened and thus inexpensive materials. In particular, by using at least three rollers it becomes possible to design the individual rollers smaller than when using fewer than three rollers, whereby the device as a whole can be manufactured less expensively.

Preferably, the first roller bearing unit includes a first spherical plain bearing, which supports (bears) the first roller. In such an embodiment, a durable design can be achieved.

The support element is advantageously formed as one piece. The term "one piece" shall be understood in particular to mean from one casting and/or from one injection molding and/or only separable by destroying or tearing the component. In other words, a "one piece" component does not have a seam in it resulting from adhering, welding, soldering, etc., two separate parts (or two edges of a single part) together. A stable and inexpensive design can be achieved with such one-piece components.

Further objects, aspects, embodiments, advantages and designs of the present teachings will be explained in the following, or will become apparent, with the assistance of the exemplary embodiments and the appended Figures.

DETAILED DESCRIPTION OF THE INVENTION

Figure 1:
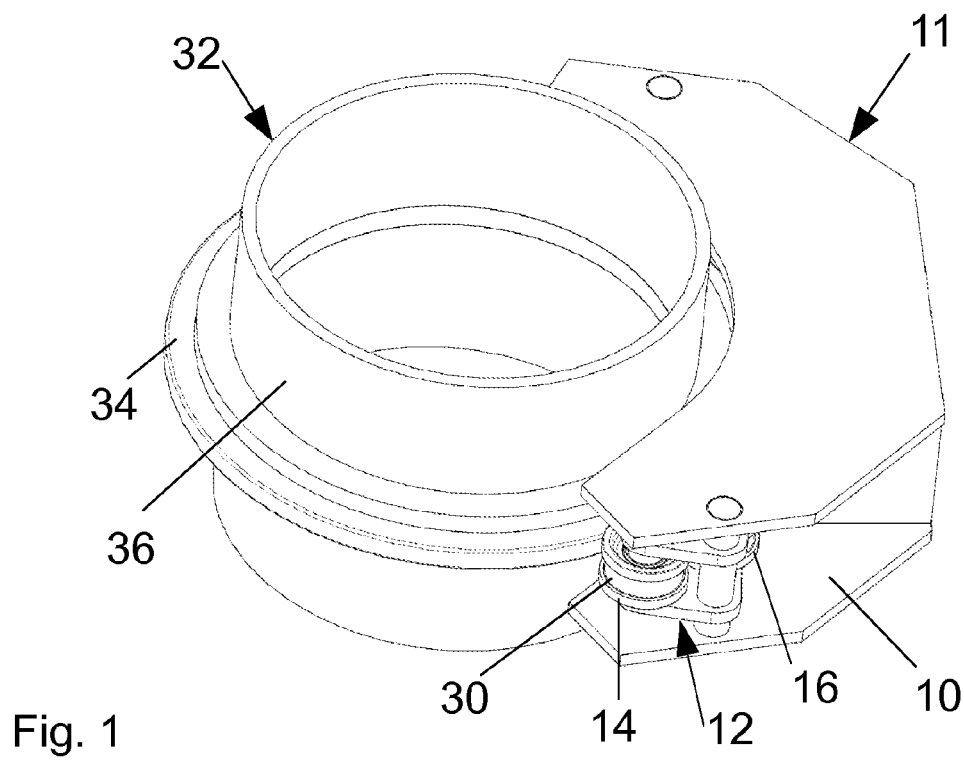
FIG. 1 shows a perspective view of a representative bearing for a solar power plant unit, which supports a tube unit.

FIG. 1 shows a perspective view of an exemplary bearing unit for a solar power plant unit, which is formed as a bearing unit for a solar power plant mirror unit and which supports a tube unit 32 of a solar power plant mirror unit. As used herein, the terms "bearing unit" and "bearing" are intended to be interchangeable when referring to the overall bearing device.

The tube unit 32 is shown in a truncated manner along its axial direction, but is understood as extending along the length of the mirror unit as was described above.

The solar power plant mirror unit bearing unit includes a support unit 11 having a support element 10. The support element 10 is preferably formed as one piece, i.e. without a seam therein.

Figure 2:
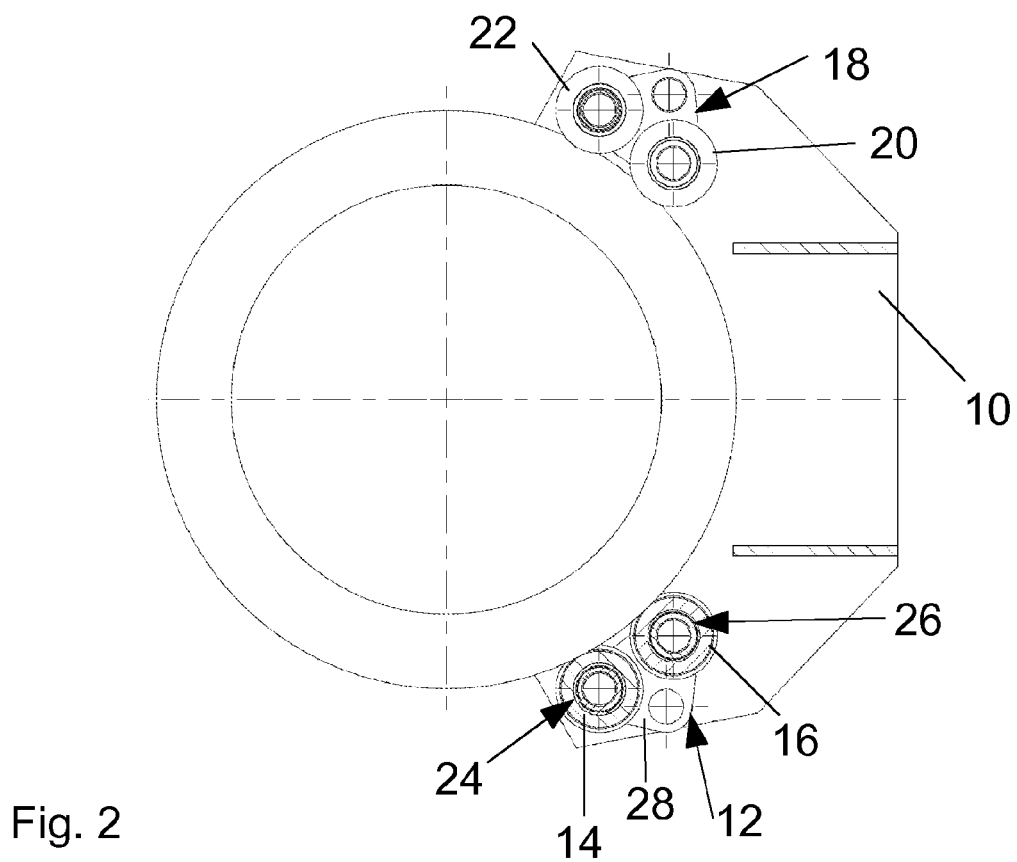
FIG. 2 shows a side view of the bearing for a solar power plant unit and the tube unit, wherein a part of the bearing is cut away for explanation purposes.

The bearing unit for a solar power plant mirror unit further includes a first and a second roller bearing unit 12, 18. The first roller bearing unit 12 is rotatably supported (borne) on the support element 10. Moreover, the second roller bearing unit 18 is also rotatably supported (borne) on the support element 10 (See FIG. 2).

Furthermore, the bearing unit for a solar power plant mirror unit preferably comprises four rollers 14, 16, 20, 22. The first and the second rollers 14, 16 are rotatably supported (borne)

by the roller bearing unit 12 relative to a support component 28 of the roller bearing unit 12. The third and the fourth rollers 20, 22 are rotatably supported (borne) by the roller bearing unit 18. The first and second roller bearing units may have identical constructions.

Figure 3:
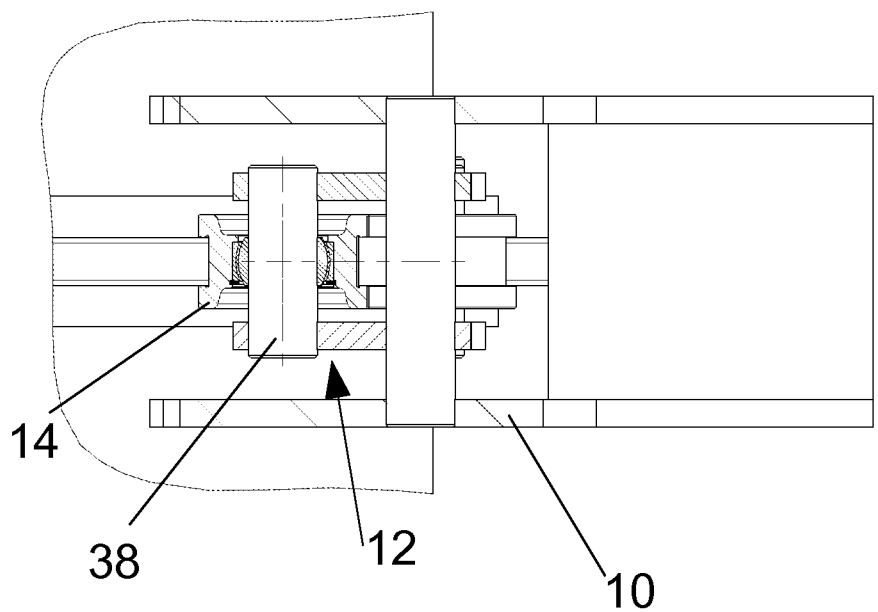
FIG. 3 shows a partial section through the bearing for a solar power plant unit and through a part of the tube unit.

The first roller bearing unit 12 includes a spherical plain bearing 24 which supports the first roller 14 (See FIG. 3). Moreover, a second spherical plain bearing 26 of the roller bearing unit 12 supports the second roller 16. Each of the rollers has a groove 30, which extends 360° around the circumferential direction of the respective roller. The groove base of the respective roller forms a rolling surface.

The first and second spherical plain bearings 24, 26 may have identical constructions. A bolt 38 of the spherical plain bearing 24 is fixed relative to the support component 28. Further, a component or part of the spherical plain bearing 26 is fixed relative to the support component 28. Further, an inner ring of the spherical plain bearing 24 has a spherical surface and is attached to the bolt 38 in the radial direction of the spherical plain bearing 24. The roller 14 is attached to the outer ring of the spherical plain bearing 24. The outer ring of the spherical plain bearing 24 has an inner surface in the radial direction of the spherical plain bearing 24. The inner surface abuts the surface of the inner ring, so that the axial direction of the roller 12 is tiltable relative to the axial direction of the inner ring.

The tube unit 32 includes a spring 34, which extends 360° around the circumferential direction of a tube 36 of the tube unit 32 and engages in (protrudes into) each of the grooves. Forces that act on the tube in the axial and radial direction of the tube are transmitted to the rollers by the contact of the spring and the grooves. The spring is attached to the tube. A linear expansion of the tube unit caused by heating causes the rollers to tilt about their respective axial directions. Edge stresses on the rollers can thereby be avoided.

The interiors of the spherical plain bearings 24, 26 contain lubricant and are sealed relative to the outside environment, such that the spherical plain bearings are maintenance-free.

Figure 4:
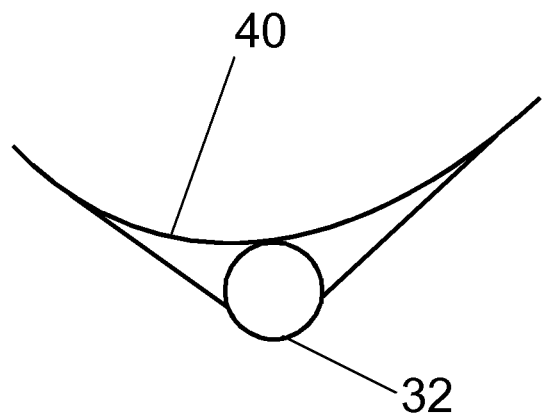
FIG. 4 shows a schematic side view of a mirror unit of a solar power plant unit, which includes the tube unit.

An exemplary solar power plant includes the mirror unit shown in FIG. 4, which includes the tube unit 32 and a mirror 40. Further, the bearing unit for a solar power plant unit is part of the solar power plant. The mirror is attached to the tube unit. The mirror has a parabolic shape and reflects sunlight to heat a fluid flowing in a tube or pipe.

The solar power plant has a pylon on which the bearing unit for a solar power plant unit is attached. The tube unit is supported by a plurality of such pylons and bearing units for a solar power plant unit. Actuators can move the tube unit, and thus the mirror, relative to the pylons.

Despite heavy contamination, sunlight, moisture, and extreme temperature fluctuations, the bearing unit for a solar power plant unit according to the present teachings is durable, and the service life may be at least thirty years. The design of the bearing unit for a solar power plant unit is compact, because otherwise the size of the mirror would have to be reduced.

A uniform abutment of the rollers on the tube unit, and thus a uniform load distribution, is achieved by the movable support (bearing) of the rollers.

The spherical plain bearing shown in FIG. 3 can be replaced by two angular contact spherical plain bearings, in particular in applications of the present teachings in which high axial loads are expected.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing devices and methods for manufacturing and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Support element
11 Support unit
12 Roller bearing unit
14 Roller
16 Roller
18 Roller bearing unit
20 Roller
22 Roller
24 Spherical plain bearing
26 Spherical plain bearing
28 Support component
30 Groove
32 Tube unit
34 Spring
36 Tube
38 Bolt
40 Mirror

We claim:

1. A bearing device for a solar power plant unit, comprising:
   a support element,
   a first roller bearing unit movably supported on the support element,
   a first roller and a second roller disposed on the first roller bearing unit, the first roller bearing unit supporting the first and second rollers at two points along a circumference lying within a plane,
   the first roller comprising a first spherical plain bearing such that the first roller is attached to an outer ring of the first spherical plain bearing, an inner ring of the first spherical plain bearing being attached to the first roller bearing unit via a bolt which defines an axial direction that is planar perpendicular to the plane within which the circumference lies, the inner ring of the first spherical plain bearing having an outer surface which is convex, the outer ring of the first spherical plain bearing having an axis of rotation and an inner surface that is configured to slidingly contact the outer surface of the inner ring of the first spherical plain bearing such that the axis of rotation of the outer ring is tiltable relative to the axial direction of the bolt such that the bearing device is configured to have the outer ring that is axially tiltable relative to the support element.

2. The bearing device according to claim 1, further comprising:
a second roller bearing unit rotatably supporting a third roller.

3. The bearing device according to claim 2, wherein the second roller bearing unit further rotatably supports a fourth roller.

4. The bearing device according to claim 3, wherein the first and second spherical plain bearings of the first roller bearing unit are separate and distinct from each other such that the first and second spherical plain bearings of the first roller bearing unit are configured to each have a different axial tilt.

5. The bearing device according to claim 4, wherein the first roller bearing unit further includes a second spherical plain bearing that supports the second roller.

6. The bearing device according to claim 5, wherein:
the first roller bearing unit further includes a support component formed as one piece, and
at least a part of the first spherical plain bearing and at least a part of the second spherical plain bearing are fixed relative to the support component.

7. The bearing device according to claim 6, wherein a groove is defined in the first roller and in the second roller and the groove extends around a circumferential direction of the first and second rollers.

8. A solar power plant including the bearing device according to claim 7.

9. The solar power plant according to claim 8, further comprising:
a mirror movably supported by the bearing device.

10. The solar power plant according to claim 9, further comprising:
a tube unit attached to and supporting the mirror, and a spring at least partially disposed in the groove of the first and second rollers.

11. The bearing device according to claim 6, wherein the first and second spherical plain bearings of the first roller bearing unit are separate and distinct from each other such that the first and second spherical plain bearings of the first roller bearing unit are configured to each have a different axial tilt.

12. The bearing device according to claim 1, wherein the support element is formed as one piece.

13. The bearing device according to claim 1, wherein the first and second rollers are configured such that they can each have a different axial tilt.

14. The bearing device according to claim 13, wherein the first roller bearing unit further includes a second spherical plain bearing that supports the second roller.

15. The bearing device according to claim 14, wherein:
the first roller bearing unit further includes a support component formed as one piece, and
at least a part of the first spherical plain bearing and at least a part of the second spherical plain bearing are fixed relative to the support component.

16. The bearing device according to claim 1, wherein a groove is defined in the first roller and in the second roller and the groove extends around a circumferential direction of the first and second rollers.

17. A solar power plant including the bearing device according to claim 1.

18. The solar power plant according to claim 17, further comprising:
a mirror movably supported by the bearing device.

19. The solar power plant according to claim 18, further comprising:
a tube unit attached to and supporting the mirror, and
a spring at least partially disposed in a groove defined in the first roller and/or the second roller.

20. The bearing device according to claim 1, wherein the first roller is attached to an outer radial surface of the outer ring.

* * * * *